United States Patent
Phelps et al.

(10) Patent No.: US 9,571,684 B1
(45) Date of Patent: Feb. 14, 2017

(54) METHOD OF USING A FIDUCIAL IN DETERMINING TWO MEDIA TYPES OF DIFFERENT LENGTHS USED ON A FLATBED SCANNER

(71) Applicant: LEXMARK INTERNATIONAL, INC., Lexington, KY (US)

(72) Inventors: Michael Jo Phelps, Lexington, KY (US); Mark Lane Mayberry, Wilmore, KY (US); Edward William Yohon, Jr., Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

(21) Appl. No.: 14/971,149

(22) Filed: Dec. 16, 2015

(51) Int. Cl.
*H04N 1/40* (2006.01)
*H04N 1/00* (2006.01)
*G06K 9/20* (2006.01)
*G06K 9/46* (2006.01)
*H04N 1/10* (2006.01)
*H04N 1/60* (2006.01)

(52) U.S. Cl.
CPC ........ *H04N 1/00713* (2013.01); *G06K 9/2063* (2013.01); *G06K 9/4609* (2013.01); *H04N 1/00737* (2013.01); *H04N 1/00761* (2013.01); *H04N 1/10* (2013.01); *H04N 2201/0094* (2013.01)

(58) Field of Classification Search
CPC ............ H04N 1/00713; H04N 1/00737; H04N 1/00761; H04N 1/10; H04N 2201/0094; G06K 9/2063; G06K 9/4609
See application file for complete search history.

(56) References Cited

U.S. PATENT DOCUMENTS

2010/0008554 A1* 1/2010 Agnihotri .......... G06K 9/00134
    382/129
2015/0210099 A1* 7/2015 Barron ....................... B41J 3/60
    347/10

OTHER PUBLICATIONS

Adelson, E.H., Anderson, C.H., Bergen, J.R., Burt, P.J., Ogden, J.M.; Pyramid Methods in Image Processing; RCA Engineer, 29-6, Nov./Dec. 1984, pp. 33-41.
Lewis, J.P.; Fast Template Matching; Vision Interface 95; Canadian Image Processing and Pattern Recognition Society, Quebec City, Canada; May 15-19, 1995; pp. 120-123.

* cited by examiner

*Primary Examiner* — Quang N Vo
(74) *Attorney, Agent, or Firm* — John Victor Pezdek

(57) ABSTRACT

A method for determining a media size of a target scanned on the platen of the flatbed scanner using a fiducial placed on a backer of the flatbed scanner at a predetermined location. The fiducial is comprised of a plurality of objects, either placed in a predetermined pattern or randomly within a fiducial frame. A target is placed on the platen of the flatbed scanner and scanned along with the backer. The scanned image data of the target and backer is searched for the fiducial image. When the fiducial image is found, the media is selected to be of a first target type having a first length, and, when the fiducial is not found the target is selected to be of a second target type have a second length longer than the first length.

23 Claims, 9 Drawing Sheets

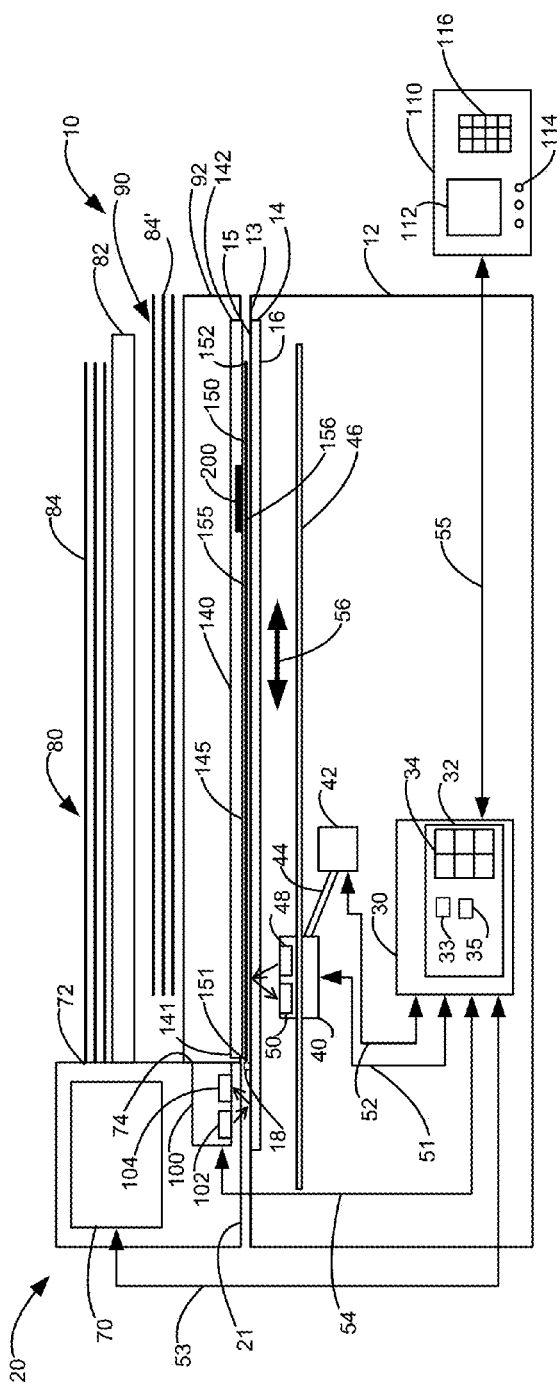
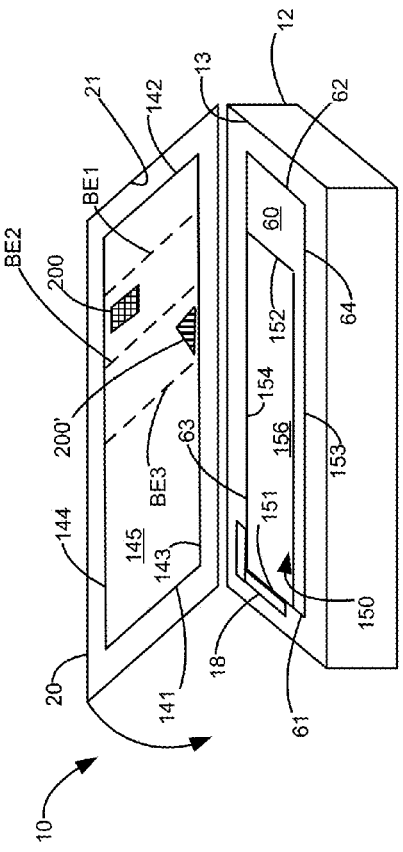
Figure 1
Figure 2

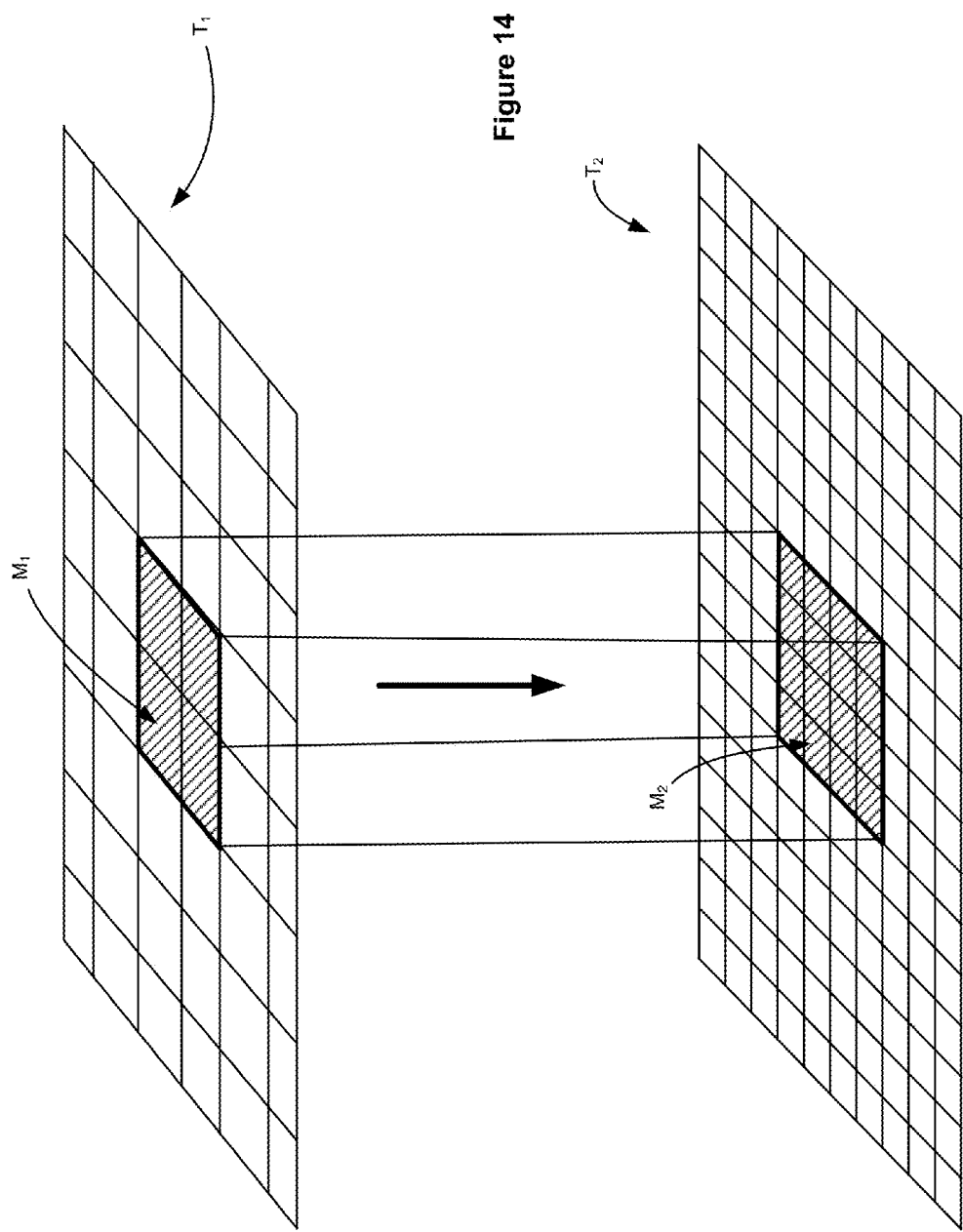

Figure 18
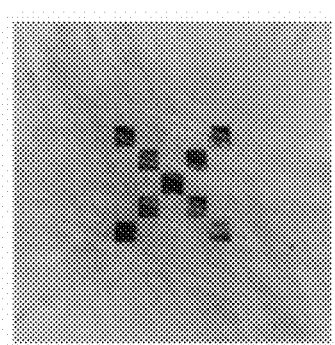
Figure 17
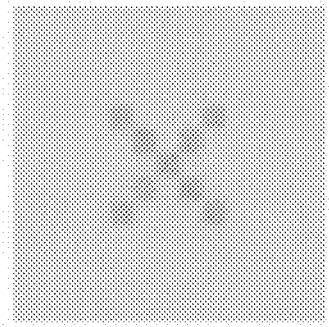
Figure 22
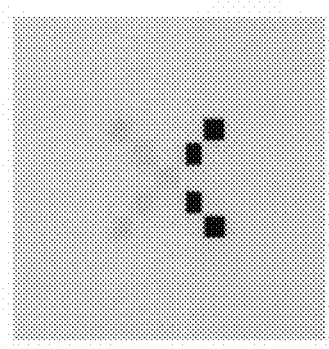
Figure 21
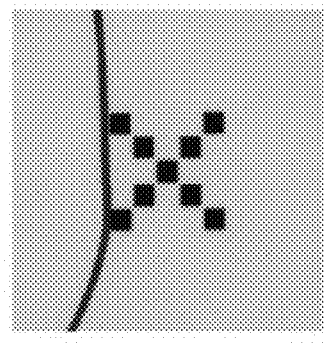
Figure 16
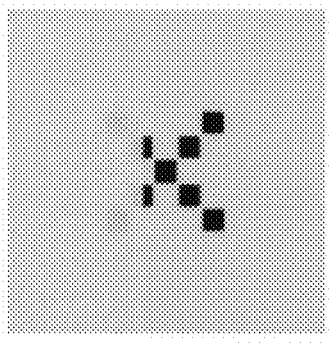
Figure 20
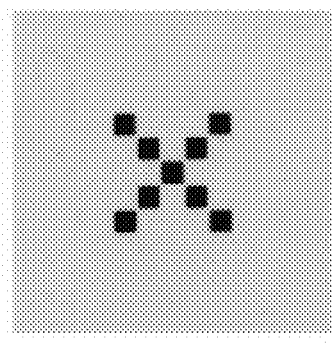
Figure 15
Figure 19

METHOD OF USING A FIDUCIAL IN DETERMINING TWO MEDIA TYPES OF DIFFERENT LENGTHS USED ON A FLATBED SCANNER

CROSS REFERENCES TO RELATED APPLICATIONS

This application is related to U.S. patent application Ser. No. 14/971,113, filed Dec. 16, 2015, and entitled "FIDUCIAL FOR USE IN DETERMINING TWO MEDIA TYPES OF DIFFERENT LENGTHS USED ON A FLATBED SCANNER".

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates generally to scanners and scanning methods, and, more particularly, to methods used to determine the length of media placed on a flatbed scanner.

2. Description of the Related Art

Many scanning systems offer a variety of methods to automatically determine the size of a piece of paper being scanned. Automatic document feeders, for example, may use sensors to detect the width at which the paper guides are set, and also might use mechanical flags or optical sensors to determine when the top and bottom of the page pass through the scanner, thus determining the paper length. Sensing paper size on the flatbed can also be done using a variety of techniques, such as taking a quick scan at a fixed location on the flatbed as the flatbed cover is being closed. In this scan, the scan bar is positioned under the flatbed glass where the paper would be placed. Without the pressure pad backer yet present, the scanned area not covered by the paper will be significantly darker than the paper due to the scanner lid not being completely closed, and image processing can then be used to calculate paper length and width. Certain scanners actually require the user to leave the flatbed cover open when automatic paper size sensing is enabled so that a similar method may be employed to find the width or length of the paper. Another method employed on flatbed scanners involves a hardware infrared light emitting diode (IR LED) and paired photodiode that determine the reflectivity at a fixed point before scanning begins. This technique can be used to determine if paper is present or not at that fixed point to distinguish between two paper sizes. This can be useful on an A4 scanner to be able to distinguish whether the original is, for example, legal versus letter length, assuming the user has placed the paper in the correct position.

Each method has advantages and drawbacks. For cover-open scans, the advantages include the ability to determine both width and length of paper without the use of a hardware sensor. Disadvantages include poor image quality and susceptibility to ambient lighting artifacts. For fixed location scan as the cover is closing, the advantages include the capability to distinguish the width of the paper without the use of a hardware sensor. The disadvantages are paper length cannot be determined and a decrease in throughput because of the extra time required to move the scan bar to the top of page to begin scanning. Using an IR LED/photo diode sensor pair has the advantage of speed of detection but also has the disadvantages that neither width nor length can be determined except when the media is present at a single point on the scan bed and the cost to implement these sensors. The IR LED sensor is adequate where image quality is critical and the scan bar is not fast enough to move back to the top of the page for the scan without negatively impacting the user's experience but the cost of the IR LED sensor is a drawback.

Accordingly, it would be an advantage to have a device and method to provide the automatic size sensing without needing to add the cost of sensor hardware. It would be a further advantage to be able to eliminate pre-scans of the media sheet to determine media length. A still further advantage would be the ability to automatically determine media length while scanning the media sheet for image processing.

SUMMARY

Disclosed is a method for determining a length of a target placed on a platen of a flatbed scanner. The flatbed scanner includes a scan bar translated beneath the platen and a scan lid with a backer mounted thereon. The platen has a scan area and the backer has a fiducial on an outer surface of the backer at a predetermined location that is within a scan area of the platen when the scan lid is in a closed position. The fiducial is between a first location L1 and a second location L2 corresponding to a bottom edge of a first target type and a bottom edge of a second target type, respectively, where L2>L1. The method comprises placing a target in the scan area and placing the scan lid in the closed position, scanning the target and the backer with the scan bar to create a scanned image, searching the scanned image for an image of the fiducial, determining whether or not the image of the fiducial has been found, on determining that the image of the fiducial has been found, selecting the target to be the first target type, and, on determining that the image of the fiducial has not been found, selecting the target to be the second target type.

Searching for the fiducial image in the image data of the scanned target and backer may comprise extracting image data of a first resolution value from the scanned image within a search grid positioned around an expected fiducial image location therein then creating from the extracted image data a set of N images of the search grid of respective decreasing resolution values from the first resolution value. Next, a lowest resolution image in the set of N images is selected as a test image and a counter is set when N=1. The test image is searched using a model image of the fiducial having the same resolution as that of the test image. A determination is made whether or not a standard deviation and a correlation value for the test image exceed respective threshold values; and, on determining that the threshold values are not exceeded, selecting the target to be a second target type. On determining that the threshold values are exceeded, the location of the fiducial image within the test image is saved and a new determination is made whether or not image N in the set of N images has been searched. On determining that the image N has not been searched, a next higher resolution scanned image from the set of N images is selected to be the test image and N=N+1. The search area or grid is rescaled to the next higher resolution and repositioned and resized using the saved fiducial image location. The method returns to searching the (new) test image with the model image of the fiducial. On determining that the image N has been searched, the target is selected to be of the first target type.

BRIEF DESCRIPTION OF THE DRAWINGS

The above-mentioned and other features and advantages of the disclosed embodiments, and the manner of attaining them, will become more apparent and will be better understood by reference to the following description of the disclosed embodiments in conjunction with the accompanying drawings.

FIG. 1 is a schematic illustration of a scanner for utilizing the presently disclosed fiducial.

FIG. 2 is an illustration of a scanner having a fiducial of the present disclosure provided on a backing member.

FIG. 14 illustrates using a peak correlation area from the search shown in FIGS. 13A-13C of a lower resolution scanned image as a focus for searching in a next higher resolution scanned image.

FIGS. 15-22 illustrate various fiducial images that may occur when scanning targets of different sizes.

DETAILED DESCRIPTION

Figure 3:
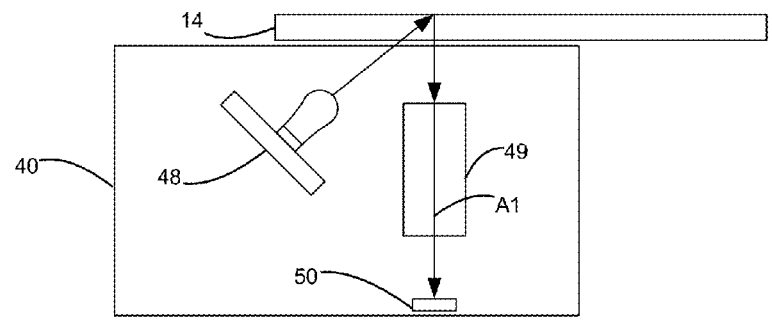
FIG. 3 is a schematic depiction of an optical reduction scan bar.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise. The use of "including," "comprising," or "having" and variations thereof herein is meant to encompass the items listed thereafter and equivalents thereof as well as additional items. Terms such as "about" and the like are used to describe various characteristics of an object, and such terms have their ordinary and customary meaning to persons of ordinary skill in the pertinent art.

Terms such as "about" and the like have a contextual meaning, are used to describe various characteristics of an object, and such terms have their ordinary and customary meaning to persons of ordinary skill in the pertinent art. Terms such as "about" and the like, in a first context mean "approximately" to an extent as understood by persons of ordinary skill in the pertinent art; and, in a second context, are used to describe various characteristics of an object, and in such second context mean "within a small percentage of" as understood by persons of ordinary skill in the pertinent art.

Unless limited otherwise, the terms "connected," "coupled." and "mounted," and variations thereof herein are used broadly and encompass direct and indirect connections, couplings, and mountings. In addition, the terms "connected" and "coupled" and variations thereof are not restricted to physical or mechanical connections or couplings. Spatially relative terms such as "top", "bottom", "front", "back", "rear", "side", "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description. Further relative positional terms are used herein. For example, "superior" means that an element is above another element. Conversely "inferior" means that an element is below or beneath another element. The explanations of these terms along with the use of the terms "top", "bottom", "front", "rear", "left", "right", "up" and "down" are made to aid in understanding the spatial relationship of the various components and are not intended to be limiting.

In addition, it should be understood that embodiments of the present disclosure include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the present disclosure and that other alternative mechanical configurations are possible.

The term "image" as used herein encompasses any printed or electronic form of text, graphics, or a combination thereof. "Media" or "media sheet" refers to a material that receives a printed image or, with a document to be scanned, a material containing a printed image. The media is said to move along a media path, a media branch, and a media path extension from an upstream location to a downstream location as it moves from the media trays to the output area of the imaging system. For a top feed option tray, the top of the option tray is downstream from the bottom of the option tray. Conversely, for a bottom feed option tray, the top of the option tray is upstream from the bottom of the option tray. As used herein, the leading edge of the media is that edge which first enters the media path and the trailing edge of the media is that edge that last enters the media path. Depending on the orientation of the media in a media tray, the leading/trailing edges may be the short edge of the media or the long edge of the media, in that most media is rectangular. As used herein, the term "media width" refers to the dimension of the media that is transverse to the direction of the media path. The term "media length" refers to the dimension of the media that is aligned to the direction of the media path. "Media process direction" describes the movement of media within the imaging system, and is generally means from an input toward an output of the imaging system. Further, relative positional terms may be used herein. For example, "superior" means that an element is above another element.

The term "image" as used herein encompasses any printed or digital form of text, graphic, or combination thereof. The term "target" refers to the media sheet having an image to be scanned. The term "button" as used herein means any component, whether a physical component or graphic user interface icon, that is engaged to initiate an action or process.

Referring to FIGS. 1-2, a schematic illustration of an example scanner and an example embodiment of a scanner are shown. Scanner 10 may be a standalone scanner or part of a multifunction device having printing and copying capabilities. Scanner 10 includes a base 12 having a platen 14 incorporated into an upper surface 13 thereof. A scan lid 20 is moveably attached to base 12 and moveable between an open position where scan lid 20 is raised away from platen 14 and a closed position, as shown, where scan lid 20 covers platen 14. Platen 14 is transparent having top and bottom surfaces 15, 16, respectively, and provides a scan area 60 into which a target 150 is placed. For purposes of description, a top edge 61, a bottom edge 62, and side edges 63, 64 are indicated for scan area 60 and a top edge 151, a bottom edge 152, side edges 153, 154, and top and bottom surfaces 155, 156 are indicated for target 150. Bottom surface 156 of the target 150 is the surface that is being scanned and is in contact with the upper surface 15 of platen 14. The direction of scanning is typically from the top edge 61 to the bottom edge 62 of the scan area 60.

As illustrated, the scan area 60 is rectangular in shape, directed orthogonally into the plane of the page of FIG. 1, and, typically, has a slightly smaller area than that of platen 14. The scan area 60 is sized to handle various sizes of targets, such as A4, Letter, Legal or Ledger sized media, or smaller media such as A6, that are typically positioned lengthwise within the scan area 60. At one corner of the scan area 60 on the top surface 15 of platen 14, an alignment member 18 is provided on upper surface 13, and is used to align one corner of the target 150 with those of the scan area 60 at a predetermined location. Alignment member 18 may be a L-shaped member extending along adjacent edges, such as top edge 61 and side edge 63 of scan area 60 or may be two members, one each aligned on respective adjacent edges of scan area 60.

Attached to an inner surface 21 of scan lid 20 is a backer 140 that provides, when the scan lid is in a closed position, a background for the target 150. For purposes of description, a top edge 141, a bottom edge 142, side edges 143, 144, and outer surface 145 are indicated for backer 140. When scan lid 20 is in the closed position, the outer surface 145 of backer 140 presses against the top surface 155 of target 150 to help provide a uniform focal length for scan bar 40. The backer 140 is usually made from compliant material, and is sized to substantially cover the scan area 60 within the platen 14. In one form, backer 140 has a white finish on its outer surface 145. Backer 140 may also have a black or grey finish on its outer surface 145. The outer surface 145 of backer 140 serves as a background for the target 150 during the scanning. Example compliant materials for use as backer 140 include, but are not limited to, polypropylene and polyethylene terephthalate.

Within base 12 are a controller 30, having a memory 32, a first scan bar 40, a drive motor 42 for scan bar 40, and a drive transmission 44. Drive motor 42 is operatively coupled to drive transmission 44. When scanning the target 150 placed on platen 14, drive motor 42 and drive transmission 44 translate the first scan bar 40 beneath platen 14 along the length of the scan area 60 on a pair of spaced parallel rails 46 mounted in base 12. First scan bar 40 includes a light source 48 and a photoreceptor array 50. The arrangement of platen 14 and first scan bar 40 is also referred to as a flatbed scanner.

Under direction of controller 30, first scan bar 40 moves, in a bi-directional scan direction indicated by arrow 56, along at least a portion of the length of scan area 60. Scan bar 40 under direction of controller 30 illuminates and provides successive scan lines containing image data of the bottom surface 156 of target 150 that is viewed by scan bar 40 and placed in scan area 60 of platen 14. The image data is stored in memory 32 for further processing.

Scan lid 20 may also include an automatic document feeder (ADF) 70, an input media area 80, an output media area 90, and a second scan bar 100. An input media support 82 extends from the input 72 of ADF 70 and provides input media area 80 where media 84 having images to be scanned are placed. An output media support 92 extends from the output 74 of ADF 70 and provides output media area 90 for the scanned media 84'. Second scan bar 100 also includes a light source 102 and a photoreceptor array 104. Second scan bar 100 is carried by scan lid 20 and moved away from platen 14 as scan lid 20 is raised to an open position. Second scan bar 100 is also referred to as an ADF scanner.

A user interface 110 may be provided for scanner 10. User interface 110 comprises a display 112, such as a touch screen, a plurality of indicator lights 114, and a key pad 116. Display 112 and key pad 116 may be used to provide input to controller 30. For example, a user may select single sided or duplex scanning, or color or monochrome scanning. Display 112 and indicator lights 114 may be used to provide information about the functioning and status of scanner 10 to a user. User interface 110 is operatively coupled to controller 30 and may be mounted to base 12 or to scan lid 20.

Controller 30 may be formed, for example, as an application specific integrated circuit (ASIC), and may include a processor, such as a microprocessor, and associated memory 32. Memory 32 may be any volatile or non-volatile memory or combination thereof such as, for example, random access memory (RAM), read only memory (ROM), flash memory and/or non-volatile RAM (NVRAM). Alternatively, memory 32 may be in the form of a separate electronic memory (e.g., RAM, ROM, and/or NVRAM), a hard drive, a CD or DVD drive, or any memory device convenient for use with controller 30. Memory 32 may be used to store program instructions such as in firmware module 33 for execution by controller 30 that controls operation of scanner 10. Memory 32 may also be configured to provide a look up table 34. Memory may also store image data 35 of the scanned target 150 and backer 140.

Controller 30 is communicatively coupled to scan bar 40 and scan bar drive motor 42 via communication links 51, 52, respectively. Controller 30 is communicatively coupled to ADF 70 via communication link 53. Controller 30 is communicatively coupled to scan bar 100 via communication link 54. Controller 30 is communicatively coupled to user interface 110 via communication link 55. As used herein, the term "communication link" 1o generally refers to a structure that facilitates electronic communication between two components, and may operate using wired or wireless technology. Accordingly, a communication link may be a direct electrical wired connection, a direct wireless connection (e.g., infrared or r.f.), or a network connection (wired or wireless), such as, for example, an Ethernet local area network (LAN) or a wireless networking standard, such as IEEE 802.11. Although separate communication links are shown between controller 30 and the other controlled elements, a single communication link can be used to communicatively couple the controller 30 to all of the controlled elements such as first and second scan bars 40, 100, drive motor 42, and user interface 110.

Controller 30 executes program instructions stored in memory 32 to effect the scanning on media 84 or target 150 to form a digital image thereof. For example, where duplex scanning is selected, scanner 10 would have media 84 fed through ADF 70 from media input area 80 to pass between first and second scan bars 40, 100 where the top and bottom surfaces are scanned and then out to media output area 90. Similarly, if multiple sheets of media were to be one-sided or simplexed scanned, the sheets of media may be placed in media input area 80 and fed through ADF 70 and past scan bar 100 or scan bar 40, depending on the design of scanner 10, and out to output media area 90. When a target 150 is placed on platen 14, controller 30 would, using scan drive motor 42, cause first scan bar 40 to translate along rails 46 to scan the bottom surface 156 of the target 150 to form a digital image.

First scan bar 40 may be a contact image sensor (CIS) scan bar or an optical reduction scan bar. Second scan bar 100 may be a CIS scan bar or an optical reduction scan bar. First scan bar 40 may be an optical reduction scan bar while second scan bar 100 may be a CIS scan bar and vice versa. In other words, the first and second scan bars 40, 100 do not have to be of the same type.

Where either first scan bar 40 or second scan bar 100X) is a CIS scan bar, light source 48 or light source 102 is typically an array of red, green and blue light emitting diodes (LEDs) or white LEDs in the case of a tri-linear CIS scan bar, and photoreceptor array 50 or 104 would be a corresponding array of phototransistors. A lens array 49, 103 may be positioned in the reflected light path between the photoreceptor array 50, 104 and the image being scanned (see FIGS. 2-3). Light arrays 48, 102 may consist of one to several dozen LEDs, together with, in some cases, a reflector, a diffuser or light guide, that span the width of a scan area of scanner 10. Photoreceptor array 50, 104 may consist of 600, 1200, 2400 or 4800 photoreceptors per inch (depending on resolution), and span the width of a scan area of scanner 10. If either first or second scan bars 40, 100 is a CIS scan bar, first scan bar 40 would be placed very close to the bottom surface 16 of platen 14 (top surface 15 for second scan bar 100) because CIS scan bars do not have a large depth of field.

Another more typical version of light sources 48, 102 used in a CIS scan bar has a single set of red, green and blue LEDs in combination with light guides to provide illumination of the scan line of the image to be scanned on media 84 or target 150. The illuminated image is then captured by the row of photoreceptor sensors. Monochrome scanning is typically done by illumining a combination of one of more of the red, blue and green LEDs. Less commonly done is the use of only the green LEDs during scanning. Color scanning is done by illuminating each color type of LED separately and taking a sub-scan line of each color for each resultant scan line of the image and then combining the three sub-scans to form a color resultant scan line image. This is repeated for all scan lines down the length of either the original image or target 150 or the scan area 60 to create the full two-dimensional scan image.

FIG. 3 illustrates an optical reduction scan bar that could be equivalently used in place of or in combination with the other types of scan bars. The photoreceptor array 50 and its optical axis A1 extends through a lens array 49. Light source 48 illuminates the target and the reflected light passes through lens array 49 to the photoreceptor array 50. Where the first scan bar 40 is an optical reduction type scan bar, it is comprised of a combination of a light source 48, an optical system 49, and a CCD (Charge Coupled Device) array serving as photoreceptor array 50. The CCD array 50 is a collection of tiny, light-sensitive diodes, which convert photons into electrons. These diodes are called photosites and the brighter the light that hits a single photosite, the greater the electrical charge that will accumulate at that site. Light source 48, such as a fluorescent bulb or a row of white LEDs, illuminates the target being scanned. The light reflected from the target reaches the CCD array 50 through optical system 49 comprised of a series of mirrors, filters and lenses. The exact configuration of these components will depend on the model of scanner 10 and their design and implementation is well known to one of ordinary skill in the art. Some optical reduction scanners use a three pass scanning method. Each pass uses a different color filter (red, green or blue) between the lens array 49 and CCD array 50. After the three passes are completed, program instructions programmed into controller 30 allow controller 30 to assemble the three filtered images into a single full-color image. Most optical reduction scanners use the single pass method. The lens splits the image into three smaller versions of the original. Each smaller version passes through a color filter (red, green or blue) onto a discrete section of the CCD array 50. Again, the controller 30 combines the data from the three parts of the CCD array into a single full-color image.

As previously mentioned, there are several types of light sources for a scan bar. Fluorescent lamps light all white across the width of the scan line. CIS scan bars typically use a scan line wide light guide that distributes light from three LEDs (one red, one green, one blue) at one end of the light guide across the width of the scan line. Another LED type light source for use with CCD type photoreceptors in optical reduction scanners uses a plurality of white LEDs (for example nine white LEDs) positioned equally across the width of the scan bar, and with some lenses and diffusers (not shown), smoothly and evenly illuminate the width of the scan line when all nine LEDs are on.

Regardless of the type of scan bar used, the scanned data forming the digital image contains a fixed number of rows and columns comprised of pixels. Pixels are the smallest individual element in the digital image, holding quantized values that represent the brightness of a given color at any specific point. Typically, the pixels are stored in memory as a raster image or a raster map, a two-dimensional array of small integers. These values are often transmitted or stored in a compressed form. The digital images may start out in non-square arrays such as 1200×600 PPI (Pixels Per Inch) or 600×300 PPI or in square arrays such as 300×300 PPI.

Typically, a length of a target 150 in scan area 60 is sensed using a media sensor that is communicatively coupled to controller 30. This sensor may be eliminated and a fiducial as described herein may be used to determine the length of the target 150. A fiducial 200 is provided on the outer surface 145 of backer 140 at a predetermined location between two of the target sizes. The fiducial 200 is positioned on the backer 140 adjacent to one of side edges 143, 144 and in the area between the bottom edges of two different sized targets 150. As shown, fiducial 200 is positioned within a predetermined area on the outer surface 145 of backer 140 between the bottom edge of a Legal sized target indicated by line BE1 that would be about 356 mm from the top end 61 of scan area 60 and the location of the bottom edge of a Letter/A4 sized target indicated by line BE2 that would be about 279 mm from the top end 61 of scan area 60. Also shown in FIG. 2 is a second fiducial 200' that may be provided between bottom edge BE2 and a bottom edge of an A6 sized target indicated line BE3 that would be about 148 mm from the top edge 61 of scan area 60. When using a single fiducial, controller 30 is able to distinguish between two different lengths of targets. For example, should only fiducial 200 be used, any target not determined to be a Legal-sized target would be considered as a Letter-sized target. Fiducial 200 is shown having a first pattern. Use of the second fiducial 200' would allow controller 30 to distinguish between three media sizes. Fiducial 200 is shown having a first symbol pattern within a rectangular area or frame and being positioned adjacent side edge 144. Fiducial 200' is shown having a second pattern within a triangular frame and positioned adjacent to side edge 143. Fiducials 200, 200' may have the same or different frame sizes and have the same or different patterns of symbols.

To reliably find the fiducial 200 or fiducial 200', the fiducial should comply with at least one of the following aspects. These include: 1) the fiducial should be comprised of a plurality or group of one or more symbol types not normally expected to be found in a target to be scanned, for example, triangles; 2) the symbols should be arranged within a predefined area also referred to as a frame, in either a predetermined pattern, for example, an X-shaped pattern of spaced square blocks or circles, or a random pattern of spaced symbols; 3) the symbols should have a high peak correlation value and a low off-peak correlation value when scanned; 4) the fiducial should be placed on a portion of the backer 140 that would be within the scan area 60 and at a location where image information would not normally be found in a target, such as in a side margin area; and, 5) the fiducial should be compact in size or area so that search area or search grid used when searching for a fiducial image may be reduced and that the searching within the image data is not burdensome on controller 30 and allows the search to be performed quickly.

Figure 4:
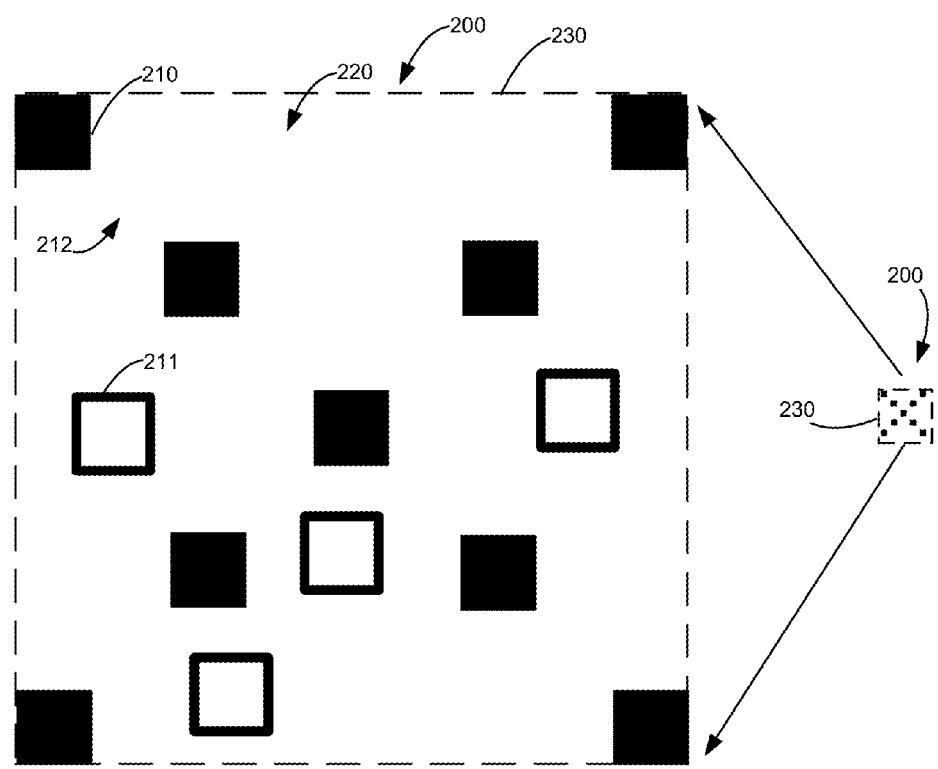
FIG. 4 is an example fiducial of the present disclosure.

FIGS. 4-7 illustrate various forms of the fiducial 200 that fall within aspects 1-3 above. In FIG. 4, fiducial 200 on the right side of the page is shown at approximately actual size in a frame 230 of about 6 mm×6 mm and to the left in an enlarged view. Frame 230 is shown only for purposes of description and would not normally be visible around fiducial 200 and refers to an area in which the majority of all the elements comprising the fiducial 200 would be found. Fiducial 200, in one form, is comprised of a plurality of a single type of symbol 210, as shown, solid black squares 210, and arranged in a predefined pattern 220, such as an X-shaped pattern 220. The plurality of symbols 210 are within frame 230, indicated by the dashed line which is an area corresponding to the overall size of the fiducial 200. Space 212 is provided around each of the symbols 210 to assist with meeting aspect 2 above. Symbols 211, shown as empty squares, help illustrate a more random pattern being used in fiducial 200.

Figure 5:
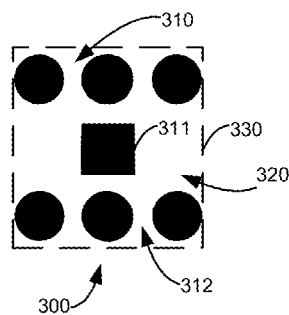
FIGS. 5-7 are additional example of fiducials of the present disclosure.
Figure 6:
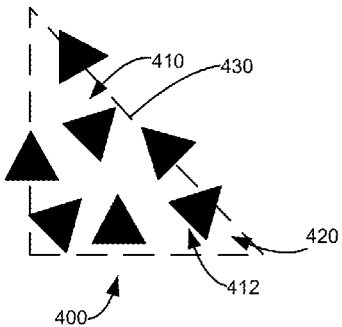
Figure 7:
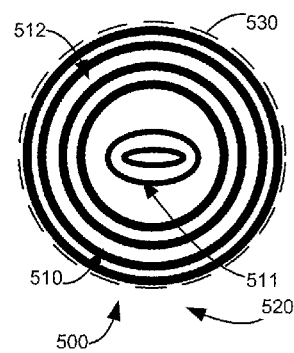

FIGS. 5-7 illustrate other example fiducials 300, 400, and 500 that have been enlarged. In FIG. 5, fiducial 300 is comprised of two symbol types 310, 311, a plurality of black circles 310, a black square 311, arranged in a capital I-pattern 320 within frame 330. Spacing 312 is provided between the symbols 310, 311. In FIG. 6, fiducial 400 is comprised of one symbol type 410, a plurality of black triangles 410, in a random pattern 420 within a frame 430 having a triangular shape. Again, spacing 412 is provided between the symbol types 410. In FIG. 7, fiducial 500 is comprised of two symbol types 510, 511, a plurality of black rings 510, and a plurality of ellipses 511, in a concentric pattern 520 within a circular frame 530. Spacing 512 is provided between each of the rings and the ellipses 510, 511, respectively. It should be understood that the above example fiducials 200, 300, 400, 500 should not be considered as limiting and other symbols, patterns, frame shapes, and spacing may readily be used as one of ordinary skill in the art would recognize. While fiducials 200, 300, 400, 500 are shown as being black, they can be any color, for example yellow, red, green, blue, etc. Alternatively, the fiducials 200, 300, 400, 500 may be formed using an ink that only absorbs or reflects differently than the backer 140 such as inks in the infrared or ultraviolet spectrum. Fiducials 200, 300, 400, 500 may be printed on the outer surface 145 of backer 140 or may be printed on labels that are applied to the outer surface 145.

Figures 8, 9:
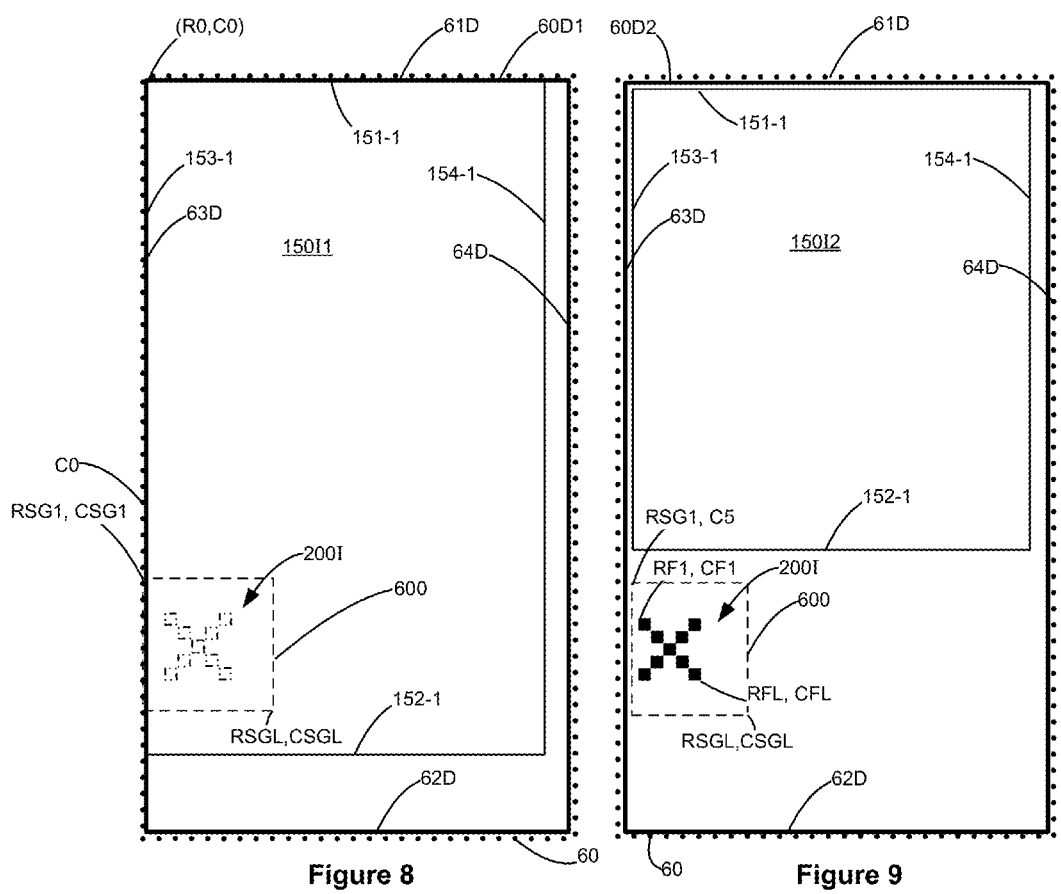
FIGS. 8-9 depict the relationship between a fiducial and two different sized targets where in FIG. 8 the target is Legal-sized and in FIG. 9 the target is Letter-sized.

FIGS. 8-9 illustrate digital images 60D1, 60D2, indicated by the heavier line boxes that are coincident with the size of scan area 60 indicated by the dotted line box. Edges 61D, 62D, 63D, 64D in each of digital images 60D1, 60D2 correspond to edges 61-64, respectively of scan area 60. Digital image 60D1 includes scan data representative of a Legal-sized target image 150I1 whereas digital image 60D2 includes scan data representative of a Letter-size target image 150I2 as well as scan data representative of a an image 200I of the fiducial 200. Digital images 150I1, 150I2 each have top, bottom edges 151-1, 152-1 and side edges, 153-1,154-1. Digital image 150I1 has top edge 151-1 and side edge 153-1 shown coincident with the corresponding edges of digital image 60D1 while digital image 150I2 is shown as being inset from the edges of digital image 60D2 as may occur when the target 150 is not properly aligned within scan area 60. The position of a fiducial 200 is indicated by dot-dash lines in digital image 60D1 for purposes of illustration only because it was covered by the legal sized target during the scanning process and would not actually be present. Fiducial image 200I is the image created from fiducial 200 during scanning of the target 150 and the backer 140. The scan data represents the view looking up from scan bar 40 through platen 14 toward backer 140 as shown in FIG. 1.

The fiducial image 200I has been enlarged for purposes of illustration. Fiducial image 200I is positioned adjacent to one of the side edges of digital image 60D 1, side edge 63D as shown, at a location that is between the respective bottom ends 152-1 of the digital images 150DI1, 150DI2. Shown around fiducial image 200I is a search grid 600 which is an area within the digital image 60D1 or 60D2 around the expected location of the fiducial image 200I. Search grid 600 will be searched to see if the fiducial image 200I is present in the image data. While the entirety of the digital image 60D1 or 60D2 may be searched for the fiducial image 200I, because the position of the fiducial 200 is known, the expected location of the fiducial image 200I within digital image 60D1 or 60D2 is known allowing the search process to be truncated to an area around where the fiducial image 200I is expected. In one form, search grid 600 is a square of approximately 50 mm centered about the expected fiducial image location. Search grid (SG) 600 is shown as extending between a first search grid row and column RSG1, CSG1 to a last search grid row and column RSGL, CSGL comprising search grid 600. Fiducial (F) image data is indicated as beginning at a first fiducial row and column RF1, CF1 and extending to a last fiducial row and column RFL, CFL. Search grid column CSG1 may be coincident with column C0 of digital image 60D1 as shown or can be shifted to another column as shown in digital image 60D2 at column C5. The search grid 600 is made larger than the frame size of fiducial 200 which is represented by the array [RFI, CF1: RFL, CFL] to account for manufacturing tolerances and wear of scan lid 20 that can affect the placement of fiducial 200 within scan area 60. During the scan to create the scan data shown in FIG. 8, fiducial 200 would be covered by the target, meaning no fiducial image data would be present in digital image 60D1 while during the scan for in the scan data shown in FIG. 9, fiducial 200 would be visible to the first scan bar 40, and, thus digital image 60D2 would have fiducial image 200I data.

As is known, the scan data is comprised of rows and columns of pixels. The number of rows and columns being dependent on the resolution of the scan. The topmost, left corner is designated as row zero, column zero indicated at coordinates (0,0). For each resolution of scan data used, the expected starting and ending row and column locations of fiducial is known as well as the expected starting and ending row and column locations of the search grid 600 that will be used when searching for fiducial 200. As shown for purposes of description, assuming scan data having a resolution of 75×75 pixels per inch, for fiducial 200 shown in FIGS. 8-9, digital images 60D 1 and 60D2 may have a size of about 230 mm by about 381 mm and extend from coordinates (0,0) to (1125,675), search grid 600 may begin at coordinates (675, 0), approximately 305 mm from top end 61 of scan area 60, and end at coordinates (825.149), approximately 356 mm from top end 61. A predetermined location for fiducial 200 having a size of 6 mm may begin at coordinates (775,10) and end at coordinates (795,30). The above coordinates are provided only for purposes of description and not limitation. Should a higher resolution scan be used, the row and column coordinates would increase. For example, if the resolution were 150 pixels per inch, the values of the coordinates would double. Coordinate values for search grid 600 and fiducial 200 for each resolution of scan data to be used when searching for fiducial 200 may be stored in lookup table 34.

Figure 10:
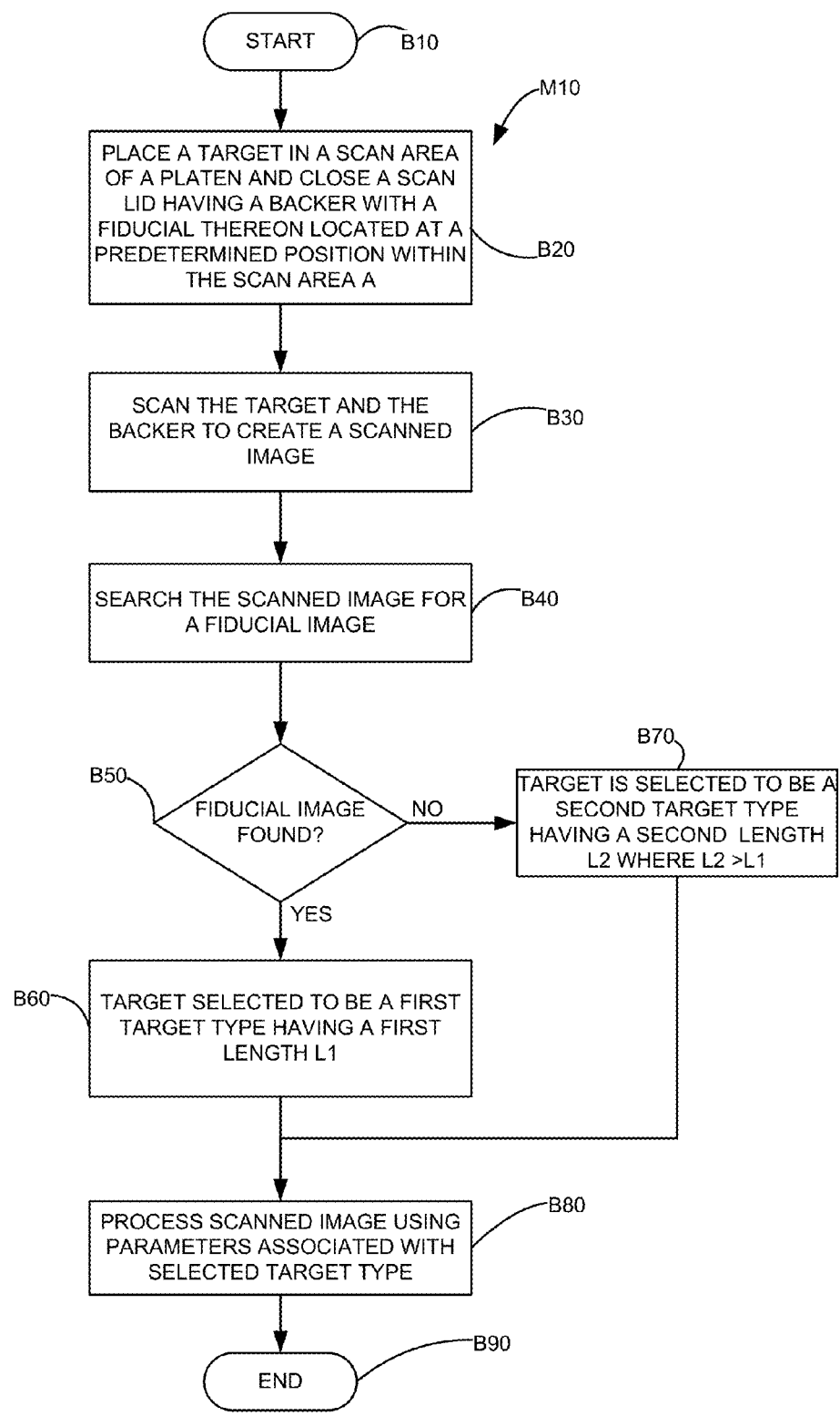
FIG. 10 is a flow chart of a method using the fiducial to determine a target size between two target size types.

Method for searching for and using the fiducial image within the scan data of a target and the backer to determine a target type will be described with respect to FIGS. 10-14. In FIG. 10 is described a method M10 used in a flatbed scanner to determine between two target types of different lengths in a scanned target. Method M10 starts at block B10 and proceeds to block B20 at which occurs the act of placing a target in the scan area of a platen of the flatbed scanner and closing a scan lid having a backer with a fiducial thereon located at a predetermined position within the scan area. Next at block B30, the target and backer are scanned to create a scanned image. After scanning, at block B40, the scanned image is searched for the fiducial image. Thereafter, at block B50, a determination is made whether or not the fiducial image was found in the scanned image. On determining, at block B50, that the fiducial image was found, the method M10 proceeds to block B60 where the target is selected to be a first target type having a first length L1. On determining, at block B50, that the fiducial image was not found, the method M10 proceeds to block B70 where the target is selected to be a second target type having a second length L2 that is longer than the length L1 of the first target type. After the target type is selected at blocks B60 or B70, the scanned image, at block B80, is processed using parameters associated with the selected target type. One parameter is the length of the selected target type which also infers a width of the selected target type. Method M10 ends at block B90.

Figure 11:
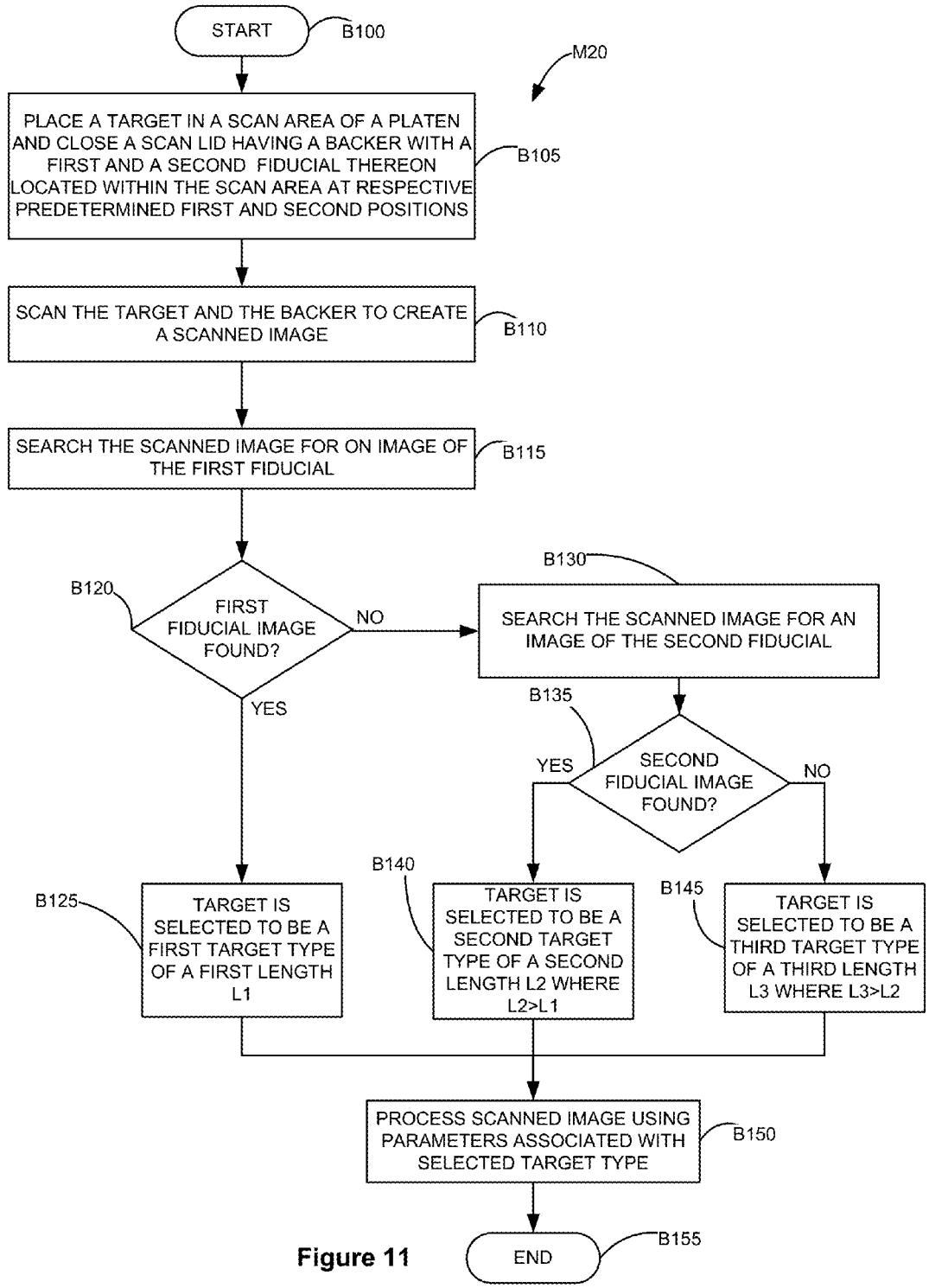
FIG. 11 is a flow chart of a method using two fiducials to determine a target size from among three target size types.

FIG. 11 illustrates a method M20 that utilizes two fiducials on the backer 140 of the scan lid 20 to determine a target type among three possible target types of differing lengths. Method M20 starts at block B100 and proceeds to block B105 at which occurs the act of placing a target in the scan area of a platen of the flatbed scanner and closing a scan lid having a backer with a first and a second fiducial thereon located at respective predetermined first and second positions within the scan area. Next at block BI 10, the target and backer are scanned to create a scanned image. After scanning, at block B115, the scanned image is searched for the first fiducial image. Thereafter, at block B120, a determination is made whether or not the first fiducial image was found in the scanned image. On determining, at block B120, that the first fiducial image was found, the method M20 proceeds to block B125 where the target is selected to be a first target type having a first length L1. On determining, at block B120, that the first fiducial image was not found, the method M20 proceeds to block B130 where the scanned image is searched for an image of the second fiducial. Thereafter, at block B135, a determination is made whether or not the second fiducial image was found in the scanned image. On determining, at block B135, that the second fiducial image was found, the method M20 proceeds to block B140 where the target is selected to be a second target type having a second length L2 where L2>L1. On determining, at block B135, that the second fiducial image was not found, the method M20 proceeds to block B145 where the target is selected to be a third target type having a third length L3 where L3>L2. After the target type is selected at blocks B125, B140, or B145, the scanned image, at block B150 is processed using parameters associated with the selected target type. One parameter is the length of the selected target type which also infers a width of the selected target type. Method M20 ends at block B155.

For method M20, the order in which the first and second fiducial images are searched may be reversed or may occur concurrently and is a matter of design choice and not of limitation. Also, as would be recognized by a person of ordinary skill in the art, method M20 may be further augmented to search for additional fiducials to provide for additional target types of different lengths.

Figure 12:
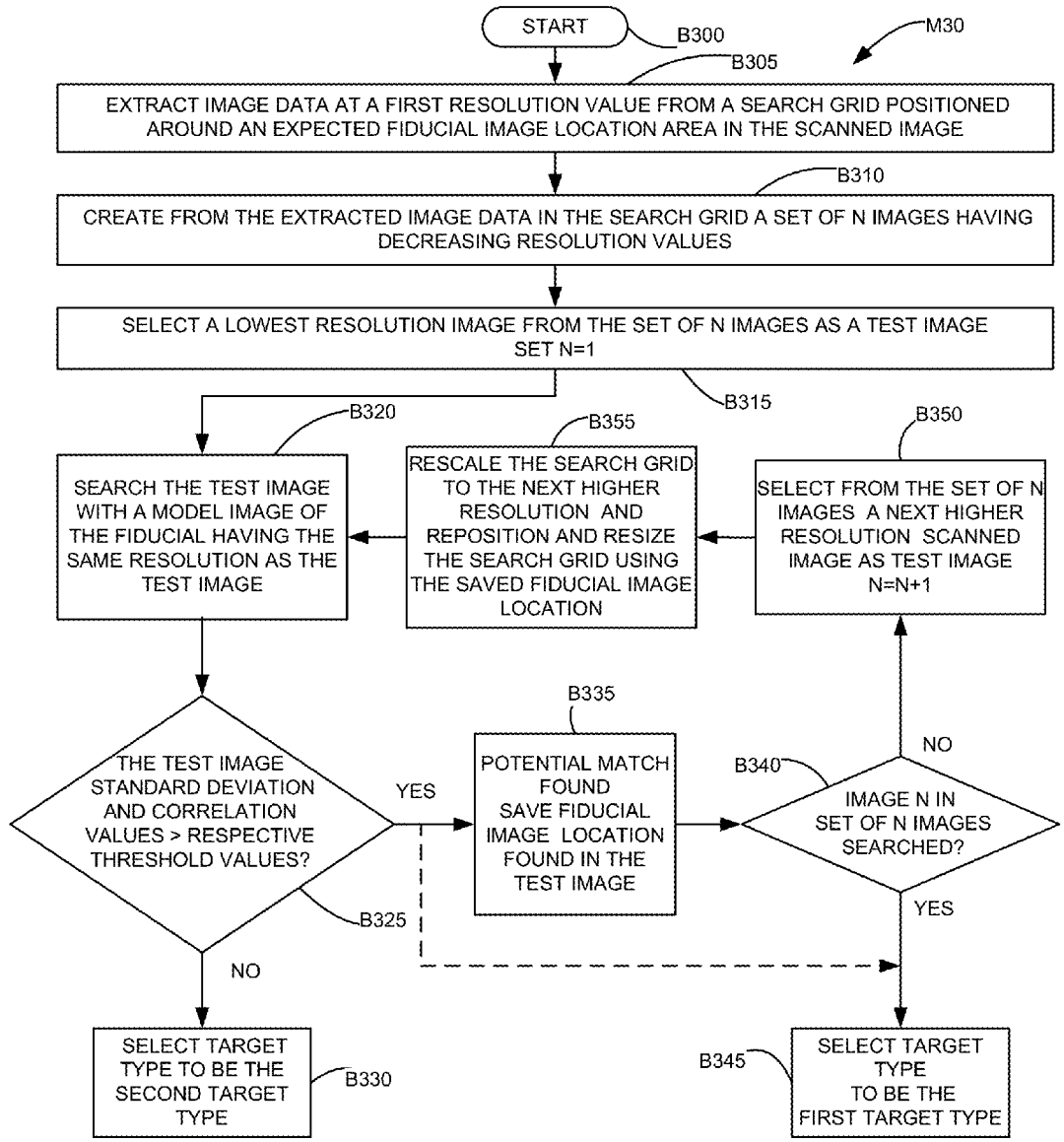
FIG. 12 is a flow chart of one example method of template matching used for searching for a fiducial image in the scanned image data of the target and backer.

For methods M10 and M20, one method M30 for determining whether or not a fiducial image has been found in the scanned image is described with respect to FIGS. 12-14. Method M30 starts at block B300 and processed to block B305 where image data is extracted at a first resolution value from a search grid positioned around an expected fiducial image location area in the scanned image. Next, at block B310, a set of N images of decreasing resolution values is created from the data in the search grid. For example, if the initial scan of the target and backer was performed at a non-square resolution such as 600×300 PPI, then the next lower resolution image in the set can be built using a box filter to downsample the initial scanned image 2-to-1 horizontally only to obtain the next lower resolution images having a resolution of 300×300 PPI. The next subsequent lower resolution image would be created by downsampling the next lower resolution image 1-to-1 vertically and horizontally to create a 150×150 PPI image. Using the same process, the next lower resolution image would be a 75×75 PPI image with the lowest resolution image being a 37.5×

37.5 PPI image. Other methods of downsampling to create the set of N images of decreasing resolution may be used.

Thereafter, at block B315, a lowest resolution image from the set of N images is selected as a test image and N is set to 1. Proceeding to block B320, the test image is searched with a model image of the fiducial having the same resolution as the test image. At block B325, a determination is made whether or not both a standard deviation value and a correlation value of the test image are greater than respective threshold values. On determining, at block B325, that both the standard deviation and the correlation values of the test image are less than their respective threshold values indicating that the fiducial image has not been found, method M30 proceeds to block B330 where the target type is selected to be the second target type. On determining, at block B335, that both the standard deviation and the correlation values of the test image are greater than the respective threshold values indicating that a fiducial image may have been found, method M30 proceeds to block B335.

At block B335, a potential match for the fiducial image may have been found in the current test image and the location of the fiducial image in the test image is saved. Thereafter, at block B340, a determination is made whether or not the image N in the set of N images has been searched. On determining, at block B340, that the image N in the set of N images has been searched, method M30 proceeds to block B345. There, at block B345, the target type is selected to be the first target type.

On determining, at block B340, that the image N in the set of N images has not been searched, method M30 proceeds to block B350 where a next higher resolution scanned image is selected from the set of N images and N is set to N+1. Thereafter, at block B355, the search grid resolution is rescaled to match the resolution of the next higher resolution scanned image selected from the set of N images. The search grid may further be resized and repositioned to the saved location at which the image of fiducial was found in the prior test image. The entirety of the next higher resolution may be searched for the fiducial image. However, as the resolution of the test image increases, searching of the higher resolution image occurs over an area determined by the search results for the prior lower resolution image allowing for more rapid image processing. Method M30 then returns to block B320 to conduct a new search on the new test image. Method M30 will search only the next higher resolution image in the set of N images only if the fiducial image was found in the prior low resolution test images. With method M30, when the fiducial image is not found in the current test image, method M30 proceeds to block B330 where the target type is selected to be the second target type.

Alternatively at block B325, on determining that a match was found, method M30 may proceed to block B345 selecting the target type to be the first target type and foregoing the searching of the remaining images in the set of N images. Further, at block B310, when the set of N images of decreasing resolution of the data in the search grid is created, a corresponding set of N images matching decreasing resolution of the model image of the fiducial may also be created for use at block B320 in searching the test image. Further, when two fiducials are used as described with respect to method M20, method M30 may be used to determine, using a second set of N images of decreasing resolution taken from a search area around the expected location of the second fiducial, whether or not the target types to be searched would be one of the second target type and the third target type. In the modified method, the model image of the fiducial would be that of the second fiducial and the first and second target types would become the second and third target types, respectively.

Figure 13A:
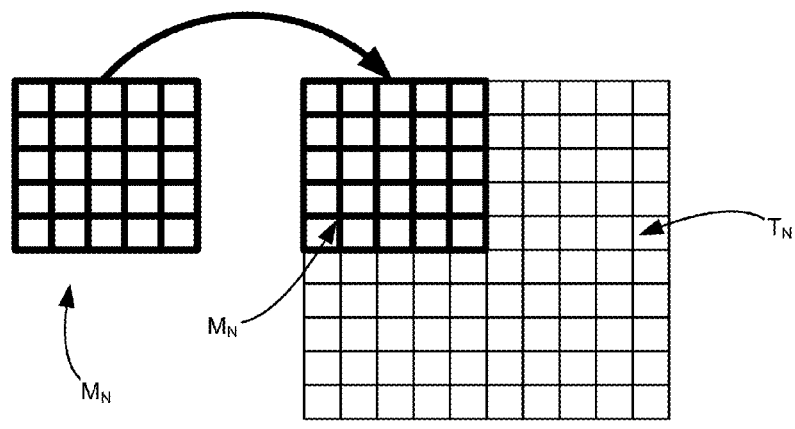
FIGS. 13A-13C illustrate the use of a model fiducial image to search a scanned image of a target and backer for an image of the fiducial.
Figure 13B:
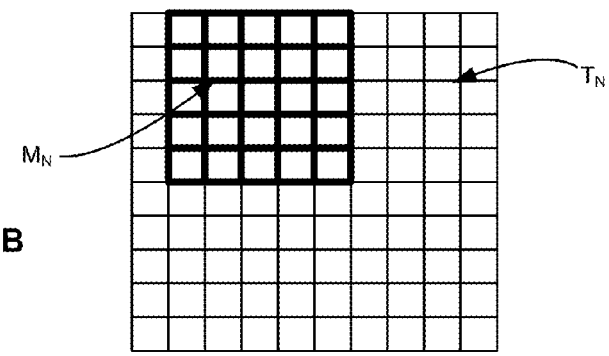
Figure 13C:
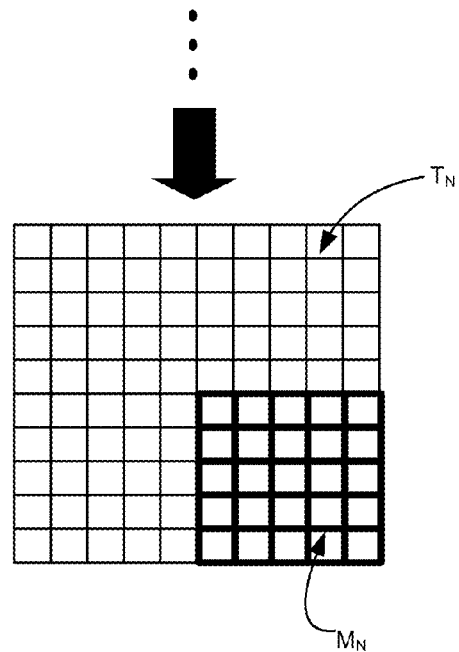

When performing, at block B320, the act of searching the test image $T_N$ with the model image $M_N$ of the fiducial of the same resolution, once the lowest resolution image in the set of N images is obtained, the model image $M_{N\ where\ N=1}$ of the fiducial of the same resolution is overlaid on the upper left corner of the lowest resolution test image $T_{N\ where\ N=1}$ formed from the search grid data, pixel by pixel, as shown in FIG. 13A moving to the right as shown in FIG. 13B and finishing at the lower right corner of the test image $T_N$ shown at FIG. 13C. The model image of the fiducial used in the search may be an exact replica of the fiducial or it may contain a subset of the plurality of symbols comprising the fiducial.

The normalized cross-correlation value is calculated between the model image $M_N$ of the fiducial and the scan pixels of the test image $T_N$ on which it is overlaid. Representing the scan data in the test image $T_N$ and model image $M_N$ of fiducial images as two-dimensional discrete functions f and g, the normalized cross-correlation calculation is shown in Eq. 3, which uses the average $\bar{f}$ shown in Eq. 1 and the standard deviation $\sigma_f$ shown in Eq. 2. The cross-correlation output (f★g) of Eq. 3, also called a correlation value, is a real number between −1 and +1, where −1 implies the signals are opposites, 0 implies the signals are unrelated, and +1 implies the signals are the same. Subtracting the average $\bar{f}, \bar{g}$ from each signal f and g, and dividing by the standard deviation $\sigma_f$, $\sigma_g$ of each signal means that the output of Eq. 3 is the same up to a non-zero linear transform of the pixel values, ignoring the precision of the calculation.

$$\bar{f} = \frac{1}{nm} \sum_{y=1}^{y=n} \sum_{x=1}^{x=m} f[y, x] \quad \text{Eq. 1}$$

$$\sigma_f = \sqrt{\frac{1}{nm} \sum_{y=1}^{y=n} \sum_{x=1}^{x=m} (f[y, x] - \bar{f})^2} \quad \text{Eq. 2}$$

$$f * g(t, u) \equiv \sum_{y=1}^{y=n} \sum_{x=1}^{x=m} \frac{(f[t, u] - \bar{f})(g[x+t, y+u] - \bar{g}_{t,u})}{\sigma_f \sigma_{g_{t,u}}} \quad \text{Eq. 3}$$

n=the number of rows in the discrete 2-dimensional functions f and g;

m=the number of columns in the discrete 2-dimensional functions f and g;

y=the current row;

x=the current column;

t=the column at which the normalized correlation value is being computed; and, u=the row at which the normalized correlation value is being computed.

If the correlation value at the indicated location of the fiducial is greater than a threshold at a given location within the test image $T_N$, which may or may not be specific to the particular image in the set of N images being used as the test image $T_N$, and the test image standard deviation value at this location is greater than a threshold value, which also may or may not be specific to the particular image in the set of N images being used as the test image, then the correlation value, the standard deviation and the location of the fiducial model image within the test image are saved as the best values. The model image of the fiducial is then moved one pixel to the right as shown in FIG. 13B. Once again, the normalized cross-correlation and the scan image standard deviation are computed at the new location. If the correlation value and standard deviation value is greater than the respective correlation and standard deviation thresholds and greater than the current best value, then the new location and correlation and standard deviation values become the new best values. This continues until all possible fiducial image locations have been computed with the test image $T_N$, and the best values for the search area are known and saved as provided in block B335.

If no location within the test image $T_N$ yielded a correlation value and standard deviation value greater than their respective thresholds, then the search exits with an indication that the fiducial was not found indicating that the target is of a second target type where the fiducial was covered by the target. Otherwise, the best location in the present test image $T_N$ is used to define a search area for the next higher resolution image in the set of N images as shown in FIG. 14. The upper grid represents the lowest resolution test image $T_N$ and fiducial model image $M_{N \ where \ N=1}$. The fiducial model image $M_1$, shown as a 2×2 grid, is at the best location found in test image $T_1$. Test image $T_2$ having double the resolution of test image $T_1$ is positioned below test image $T_1$. If the resolution of test image $T_1$ is N×N, the resolution of test image $T_2$ is 2N×2N. The fiducial model image $M_1$ is projected onto test image $T_2$ at a matching resolution as indicated by fiducial model image $M_2$. The search is repeated using test image $T_2$. Different correlation and/or standard deviation threshold values may be used when conducting the search of test image $T_2$. This is done until the search and best values are known for the highest resolution image in the set of N images. If the search does not end early due to no best location being found at the previous lower resolution image in the set of N images used for the test images, then the fiducial is declared to be found at the location identified in the highest resolution image in the set of N images.

The correlation threshold and standard deviation threshold used for each test image may be the same or may be different for different resolutions of the test image. For example, for the lower resolution test images, a correlation threshold of −1 and a standard deviation threshold of zero may be used while for the highest resolution test image the correlation threshold may be 0.72 and the standard deviation threshold be may be 24.

An enhancement to the described method M30 is to have two sets of correlation and/or standard deviation thresholds. The search is run with one set of thresholds, then, once the search is complete, the standard deviation and the normalized cross-correlation values for the highest resolution test image are compared to a second, higher set of thresholds. If the second set of thresholds is exceeded, then the fiducial is declared to be known to be uncovered by the target. If it does not, then the method would allow for another mechanism, such as user input, to determine paper length. If the search exits early, then the fiducial is declared to be known to be covered by the target.

For example, if the search of the highest resolution test image yielded a standard deviation higher than an empirically chosen threshold of 24.0, and a correlation value in an empirically selected range of 0.63 to 0.73, then an alternate paper size determination technique could be used. If the standard deviation was higher than the threshold value of 25 and the correlation value was greater than 0.73, then the fiducial could be declared to be uncovered and the appropriate target type would be selected, such as letter sized target type. Otherwise, the fiducial would be declared as covered and the appropriate target type, such as legal, would be selected.

Another modification to method M30 could be made. For example, if the test image standard deviation values were computed for each location where the fiducial model image was going to be overlaid, these values could be blurred and used in the normalized cross-correlation calculation. This would have the benefit of preventing sharp increases or decreases in standard deviation due to edges in the image. Another modification is to store multiple locations that exceed the thresholds at a given level of test image, and then run the higher resolution searches on all these locations down through the remaining images in the set of N images and only take the best location at the end. This would add robustness for those cases when the incorrect location might be chosen as the best location in the highest resolution image in the set of N images.

FIGS. 15-22 show several scans of a fiducial image at the highest resolution value used. A standard deviation threshold of 10 was empirically chosen, and a normalized correlation threshold of >0.0 was used. The correlation and standard deviation values provided for FIGS. 15-22 are those for the highest resolution image in the set of N images (600×300 PPI).

FIGS. 15-18 show a series of images of the fiducial 200 and the outer surface 145 of backer 140 where damage to the fiducial and outer surface 145 increases. There are various stray marks, smudging and other damage to the outer surface 145 to demonstrate the effect on the correlation and standard deviation values. FIG. 15 shows an image of the fiducial 200 that is undamaged and uncovered. The correlation value is 0.96 and the standard deviation is 52.6. FIG. 16 shows an image of the fiducial and backer having a black mark crossing the fiducial where a correlation value is 0.82 and a standard deviation is 52.6. FIG. 17 shows an image of the fiducial and backer having smudging where a correlation value is 0.82 and a standard deviation is 29.4. FIG. 18 shows an image of the fiducial and backer having smudging and several random black marks where a correlation value is 0.65 and a standard deviation is 34.4. In all of the images, the fiducial has been found uncovered and the target would be of the first target type such as Letter size.

FIGS. 19-22 show a series of images where the amount of covering of the fiducial gradually increases until it is completed covered as shown in FIG. 22. FIG. 19 shows about twenty percent of the fiducial image being covered where a correlation value is 0.85 and the standard deviation is 46.7. FIG. 20 shows about twenty-five percent of the fiducial image being covered where a correlation value is 0.80 and the standard deviation is now 43.4. FIG. 21 shows about sixty percent of the fiducial image being covered where a correlation value is 0.66 and the standard deviation is now 33.7. FIG. 22 shows a completely covered fiducial image where correlation value is 0.83 and the standard deviation is 7.7. In FIGS. 19-21, the fiducial would have been found and considered as uncovered indicating that the target would be of the first target type while in FIG. 22, the fiducial would not have been considered to be found and the target would be of the second target type.

Correlation values are affected when the scanned image has been distorted by rotation, shear, magnification and digital noise. Using bi-linear interpolation, an experiment was conducted where the scanned image of the uncovered fiducial was intentionally distorted. Using an angle of −1.5°, a Y-shear of 0.87%, a vertical magnification error of 0.5%, and a horizontal magnification error of −1.0%, the correlation value of the highest resolution image of the fiducial and backer was found to be 0.90 whereas the undistorted correlation value was 0.96. The distortion values were chosen as extremes of the types of distortions expected to be found in actual scanning systems. This indicates that the present method is very robust even in the presence of the range of distortions normally expected in actual scanning systems.

What is claimed is:

1. A method for determining a length of a target placed on a platen of a flatbed scanner having a scan bar translated beneath the platen and a scan lid with a backer mounted thereon, the platen having a scan area, the backer having a fiducial on an outer surface of the backer at a predetermined location that is within a scan area of the platen when the scan lid is in a closed position and is between a first location L1 and a second location L2 corresponding to a bottom edge of a first target type and a bottom edge of a second target type, respectively, where L2>L1, the method comprising:
   placing a target in the scan area and placing the scan lid in the closed position;
   scanning the target and the backer with the scan bar to create a scanned image;
   searching the scanned image for an image of the fiducial;
   determining whether or not the image of the fiducial has been found;
   on determining that the image of the fiducial has been found, selecting the target to be of the first target type; and,
   on determining that the image of the fiducial has not been found, selecting the target to be of the second target type.

2. The method of claim 1 wherein the searching begins in the scanned image at the first location.

3. The method of claim 1 wherein the searching for the image of fiducial comprises using fast template matching.

4. The method of claim 2 further comprising:
   extracting image data of a first resolution value from the scanned image within a search grid positioned around an expected fiducial image location therein;
   creating from the extracted image data a set of N images of the search grid of respective decreasing resolution values from the first resolution value;
   selecting a lowest resolution image in the set of N images as a test image and setting N=1;
   searching the test image with a model image of the fiducial having the same resolution as that of the test image; and
   determining whether or not a standard deviation value and a correlation value for the test image are greater than respective threshold values,
   on determining that the test image standard deviation and correlation values are not greater than respective threshold values, selecting the target to be of the second target type.

5. The method of claim 4 further comprising
   on determining that the test image standard deviation and correlation values are greater than respective threshold values, saving the fiducial image location of the test image;
   determining whether or not the image N in the set of N images has been searched, on determining that the image N has not been searched:
      selecting a next higher resolution scanned image to be the test image;
      setting N=N+1;
      rescaling the search grid to the next higher resolution, and repositioning and resizing the search grid using the saved fiducial image location; and,
      returning to searching the test image with the model image of the fiducial.

6. The method of claim 5 further comprising:
   on determining that the Nth image has been searched, selecting the target to be of the first target type.

7. The method of claim 4 further comprising
   on determining that the test image standard deviation and correlation values are greater than respective threshold values, selecting the target to be of the first target type.

8. The method of claim 1 wherein the fiducial comprises:
   a plurality of symbols printed on an outer surface of the backer within a frame at a location that will be within the scan area when the scan lid is in a closed position;
   the plurality of symbols arranged in one of a predetermined pattern and a random pattern with the frame, each symbol having a finish that reflects light differently than a finish on the outer surface of the backer and a high peak correlation value and a low off-peak correlation value when scanned.

9. The method of claim 8 wherein the model image of the fiducial includes a plurality of symbols corresponding to at least a subset of the plurality of symbols found in the fiducial.

10. The method of claim 8 wherein the outer surface of the backer has one of a white finish, a black finish and a grey finish and each symbol in the fiducial has a finish that reflects light differently than the finish on the outer surface of the backer.

11. A method for determining a length of a target placed on a platen of a flatbed scanner having a scan bar translatable beneath the platen and a scan lid with a backer mounted thereon, the platen having a scan area, the backer having a first and a second fiducial on an outer surface of the backer that is within a scan area of the platen when the scan lid is in a closed position with the first fiducial being at a first predetermined position between a first location L1 and a second location L2 corresponding to a bottom edge of a first target type and a bottom edge of a second target type, respectively, where L2>L1 and the second fiducial being at a second predetermined position between the second location L2 and a third location L3 corresponding to a bottom edge of a third target type, where L3>L2, the method comprising:
   placing a target in the scan area and placing the scan lid in the closed position;
   scanning the target and the backer with the scan bar to create a scanned image;
   searching the scanned image for an image of the first fiducial and an image of the second fiducial;
   determining whether or not that neither of the images of the first and second fiducials have been found; and,
   on determining the neither of the images of the first and second fiducials have been found, selecting the target to be of the third target type.

12. The method of claim 11, further comprising:
   on determining that at least one of the images of the first and second fiducials has been found, determining whether or not the at least one found image is one of the first fiducial and the second fiducial, and, on determining that the at least one found image is the image of the second fiducial, selecting that the target to be of the second target type.

13. The method of claim 12, further comprising:
on determining that the at least one found image is the image of the first fiducial, selecting the target to be of the first target type.

14. The method of claim 11 wherein the searching begins in the scanned image adjacent to the first location.

15. The method of claim 11 wherein the searching for the first and the second fiducial images comprises using fast template matching.

16. The method of claim 14 wherein the searching further comprises:
extracting image data of a first resolution value from the scanned image from a first search area and a second search area surrounding each of the first and second predetermined locations, respectively;
for the first search area, creating from the extracted image data, a first set of N images of decreasing resolution values from the first resolution value;
for the second search area, creating from the extracted image data, a second set of N images of decreasing resolution values from the first resolution value;
for the first search area:
selecting a lowest resolution image in the first set of N images as a test image and setting N=1;
searching the test image with a model image of the first fiducial having the same resolution as the test image;
determining whether or not a standard deviation value and a correlation value for the test image are greater than respective threshold values;
and,
on determining that the standard deviation value and a correlation value for the test image are not greater than respective threshold values:
selecting a lowest resolution image in the second set of N images as the test image and setting N=1;
searching the test image with a model image of the second fiducial having the same resolution as the test image;
determining whether or not a standard deviation value and a correlation value for the test image are greater than respective threshold values; and,
on determining that the standard deviation value and a correlation value for the test image are not greater than respective threshold values, selecting the target to be of the third target type.

17. The method of claim 16 further comprising:
for the first search area on determining image that the standard deviation value and a correlation value for the test image are greater than respective threshold values:
saving the location of the first fiducial image found in the test image;
determining whether or not an image N in the first set of N images of the first search area has been searched, and on determining that the image N the first set of N images of the first search area has not been searched:
selecting a next higher resolution scanned image to be the test image;
setting N=N+1;
rescaling the first search area image to the next higher resolution and repositioning and resizing the first search area using the saved first fiducial image location; and,
returning to searching the test image with the model image of the first fiducial;
and,
on determining that the Nth image of the set of N images for the first search area has been searched, selecting the target to be of the first target type.

18. The method of claim 17 further comprising on determining that the standard deviation and correlation values of the image N of first set of N images for the first search area is not greater than the threshold value, repeating the acts of selecting, searching and determining using the second set of N images and a model image of the second fiducial to select the target to be of one of the second target type and the third target type.

19. The method of claim 16 further comprising:
for the second search area on determining that the standard deviation and correlation values of the test image are greater than respective threshold values, selecting the target to be of the second target type.

20. The method of claim 18 further comprising
for the first search area on determining that the standard deviation and correlation values of the test image are greater than the respective threshold values, selecting the target to be of the first target type; and
for the second search area on determining that the standard deviation and correlation vales of the test image are greater than the respective threshold values, selecting the target to be of the second target type.

21. The method of claim 11 wherein the first and second fiducial each comprise:
a plurality of symbols printed on an outer surface of the backer within a frame at a location that will be within the scan area when the scan lid is in a closed position;
the plurality of symbols arranged in one of a predetermined pattern and a random pattern with the frame, each symbol having a finish that reflects light differently than a finish on the outer surface of the backer and a high peak correlation value and a low off-peak correlation value when scanned.

22. The method of claim 21 wherein the model image of the first fiducial includes a first plurality of symbols corresponding to at least a subset of the plurality of symbols found in the first fiducial and the model image of the second fiducial includes a second plurality of symbols corresponding to at least a subset of the plurality of symbols found in the second fiducial.

23. The method of claim 21 wherein the outer surface of the backer has one of a white finish, a black finish and a grey finish and each symbol in the fiducial has a finish that reflects light differently than the finish on the outer surface of the backer.

* * * * *